United States Patent [19]
Chen

[11] Patent Number: 6,026,837
[45] Date of Patent: Feb. 22, 2000

[54] AUTOMATED CHEMICAL DRAIN SYSTEM

[75] Inventor: J. S. Chen, Taipei, Taiwan

[73] Assignee: Taiwan Semiconductor Manufacturing Company, Ltd., Hsin-Chu, Taiwan

[21] Appl. No.: 08/856,631

[22] Filed: May 14, 1997

[51] Int. Cl.[7] .......................... F16K 21/16; F16K 31/02; F16K 31/12
[52] U.S. Cl. .............. 137/2; 73/304 R; 73/313; 137/389; 137/395; 137/403; 137/558; 137/572; 141/83; 141/198; 222/52; 222/64; 340/620
[58] Field of Search .................... 137/392, 395, 137/403, 572, 571, 551, 558, 389; 141/83, 198; 222/55, 56, 58, 64, 52, 57; 73/296, 304 R, 304 C, 313; 340/613, 620

[56] References Cited

U.S. PATENT DOCUMENTS

| | | | |
|---|---|---|---|
| 3,876,037 | 4/1975 | Rath, Jr. .................................. | 137/392 |
| 3,882,967 | 5/1975 | Gulla et al. ............................. | 137/392 |
| 4,132,242 | 1/1979 | Carroll, Jr. ............................. | 137/403 |
| 4,135,548 | 1/1979 | Sears ...................................... | 137/392 |
| 4,244,385 | 1/1981 | Hotine .................................... | 137/392 |
| 4,265,262 | 5/1981 | Hotine .................................... | 137/392 |
| 4,660,586 | 4/1987 | Knapp et al. ........................... | 137/392 |
| 4,852,604 | 8/1989 | Wales et al. ............................ | 137/392 |
| 5,519,638 | 5/1996 | Tiao ........................................ | 137/395 |

*Primary Examiner*—George L. Walton
*Attorney, Agent, or Firm*—Tung & Associates

[57] ABSTRACT

The present invention provides an automated chemical drain system which includes a buffer tank for collecting used chemical from a process machine, at least two level sensors in the buffer tank for sensing a fluid level and sending out a signal, a controller for receiving the signal from the level sensors and then sending out a second signal to a solenoid controlled valve when the first signal exceeds a threshold value, a solenoid controlled valve that is in fluid communication with the buffer tank and a collection tank, and a collection tank for collecting used chemical from the buffer tank. The collection tank may further be provided with a weight sensing device such that a signal may be sent out to the controller when the weight of the collection tank exceeds a maximum allowable value so that the controller shuts off the solenoid controlled valve to avoid overflow in the collection tank and to alert a maintenance operator to empty the collection tank.

14 Claims, 1 Drawing Sheet

AUTOMATED CHEMICAL DRAIN SYSTEM

FIELD OF THE INVENTION

The present invention generally relates to a chemical drain system and more particularly, relates to an automated chemical drain system that utilizes two collection tanks and a microprocessor controlled valve between the two tanks such that the overflow of the tanks can be avoided.

BACKGROUND OF THE INVENTION

In a manufacturing facility, liquid chemicals are frequently used in various manufacturing processes. For instance, in a semiconductor fabrication plant, a semiconducting substrate must be processed in a multiplicity of manufacturing steps, i.e., as many as several hundred, in order to make an integrated circuit chip. The multiplicity of manufacturing steps may include etching, cleaning, deposition or any other necessary processing steps. A variety of chemicals, including liquids and gases must be used in these steps. For instance, to etch a specific feature on a substrate, to clean after each etching or deposition steps, to deposit layers of materials on the substrate, or to carry out any other necessary processing procedures.

The variety of chemicals used in a semiconductor fabrication plant must be handled with extreme care since most of those processing liquids are either highly toxic and/or highly corrosive. For instance, strong acids are frequently used in an etcher for etching a specific structure on a semiconductor wafer. Since the acid material is not normally all consumed in the etching process, unused acid must be recycled or otherwise disposed. Due to their corrosive and toxic nature, the acid must be carefully handled and transported to avoid personal injuries and potential fire hazard.

A conventional chemical collection system 10 is shown in FIG. 1. The system 10 consists mainly of a first collection tank 12 (or a buffer tank), a second collection tank 16 and a manually operated valve 18. The first tank 12 has a waste chemical inlet 20 for the intake of waste liquid chemicals from a process machine. When the process machine is an etcher, the waste chemical is most likely a waste acid from an etching process.

As shown in FIG. 1, the first tank 12 is provided with three liquid level detectors, i.e., a low level detector 22, a mid-level detector 24, and a high level detector 26. The level detectors may be constructed of a resistance type or any other suitable type that will trigger a warning system 28. The warning system 28 may have several warning lights or alarms each corresponds to the low, mid- or high level detector 22, 24 and 26. Depending on the operating procedure at a fabrication plant, a machine operator must manually open valve 18 when the liquid level 30 in the first tank 12 reaches the low level detector 22, the mid-level detector 24 or the high level detector 26. Most manufacturing plants are provided with a warning system such that the low level detector is used as an indicator for the operator to open valve 18, while the mid- and high level detectors are used as additional safety devices to further warn the machine operator to open valve 18. When valve 18 is fully opened, the waste chemical 32 in the first collection tank 12 is drained to the second collection tank 16. The liquid level 34 in the second tank 16 must be carefully monitored so that the waste chemical 32 does not overflow from the tank. Any accidental overflow can cause injury to plant personnel and furthermore, fire hazard or property damage.

The conventional system shown in FIG. 1 has several drawbacks when it is in operation. First, the warning signals 28 may not give adequate warning to a machine operator to manually open valve 18 in order to drain the waste chemical contained in the first tank 12. Secondly, when the liquid level 34 in the second collection tank 16 is not carefully monitored, the accidental overflow of a waste chemical from the second tank can cause severe problems in a fabrication plant. The placement of the second collection tank 16 in a semiconductor fabrication plant causes additional problems since it is frequently placed at a location that is one or two floor levels below the first tank 12, while the first tank 12 is frequently placed at or near a process machine such as an etcher. When the second collection tank 16 is placed one or two floors away from the process machine, the machine operator frequently forgets to monitor the fluid level 34 in the second tank 16. Problems are frequently caused by such negligence which leads to personnel injuries or facility damages. Furthermore, when the machine operator forgets to open valve 18 to drain waste chemical 32 from the first tank 12, the first tank 12 may overflow such that the process machine must be shut down.

It is therefore an object of the present invention to provide a chemical drain system that does not have the drawbacks or shortcomings of the conventional chemical drain systems.

It is another object of the present invention to provide a chemical drain system that consists of two waste chemical collection tanks and a microprocessor controlled valve thereinbetween.

It is a further object of the present invention to provide a chemical drain system that consists of a first collection tank, a second collection tank and a microprocessor controlled valve thereinbeteween for draining from the first tank to the second tank when a level sensor in the first tank detects a certain liquid level is reached.

It is still another object of the present invention to provide a chemical drain system that consists of two collection tanks, a computer controlled valve thereinbetween, and an electronic scale for the second tank such that the valve is automatically shut when a full second collection tank is detected.

It is yet another object of the present invention to provide a chemical drain system that consists of two collection tanks, a computer controlled valve thereinbetween, a microprocessor controller and an electronic scale capable of sending a signal to the controller when a full second collection tank is detected.

It is another further object of the present invention to provide an automated chemical drain system that consists of two collection tanks and a computer controlled valve thereinbetween wherein the first tank is equipped with at least two level sensors for detecting the liquid level in the tank.

SUMMARY OF THE INVENTION

In accordance with the present invention, a chemical drain system equipped with a microprocessor controlled drain valve for automatic draining from a first collection tank to a second collection tank is provided.

In a preferred embodiment, a chemical drain system is provided which consists of a first tank for holding a liquid chemical, at least one level sensor in the first tank, a controller for receiving a first signal from the at least one level sensor and sending out a second signal, a valve in fluid communication with the first tank and a second tank for receiving the second signal, and a second tank for receiving the liquid chemical from the first tank.

In another preferred embodiment, an automated chemical drain system is provided which consists of a buffer tank for collecting used (or waste) chemical from a process machine, at least two level sensors in the buffer tank for sensing a fluid level and sending out a first signal, a controller for receiving the first signal from the at least two level sensors and sending out a second signal to a solenoid controlled valve when the first signal exceeds a threshold value, a solenoid controlled valve in fluid communication with the buffer tank and a collection tank, and a collection tank for collecting the used chemical from the buffer tank.

The present invention is further directed to a method for draining a chemical by the operating steps of providing a first collection tank equipped with a level sensor, then providing a second collection tank, then providing a valve for controlling a flow from the first collection tank to the second collection tank by a controller, and sending a signal from the level sensor when a level exceeding a threshold value in the first collection tank is sensed to the controller to open the valve such that chemical is drained from the first tank to the second tank.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention discloses a chemical drain system that includes two chemical collection tanks wherein the first tank is equipped with at least one level sensor, a microprocessor controlled valve connected in between the two tanks, and a controller for receiving a signal from the level sensor and sending out a signal to open the valve such that the chemical can be drained from the first tank to the second tank.

The second chemical collection tank may further include a weight sensing device that sends out a signal to the controller when a maximum threshold weight is detected in the second collection tank such that the valve may be shut-off to avoid overflow of the second tank.

Figure 1:
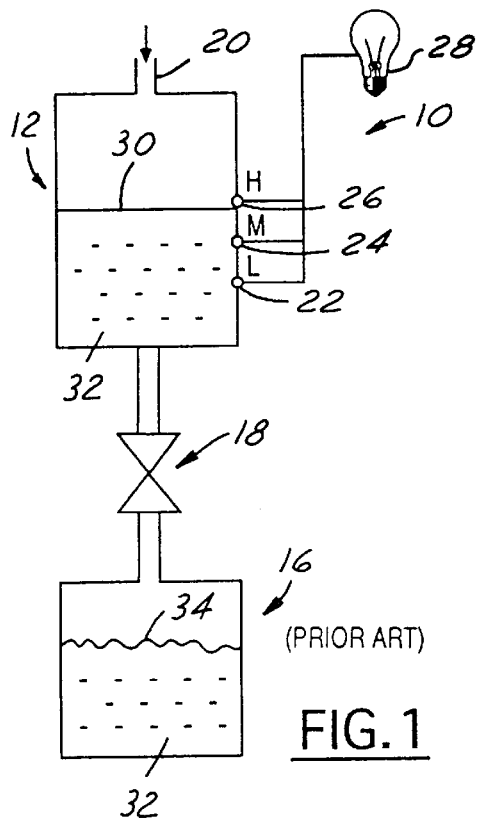
FIG. 1 is a schematic illustrating a conventional chemical drain system equipped with a manually controlled valve.
Figure 2:
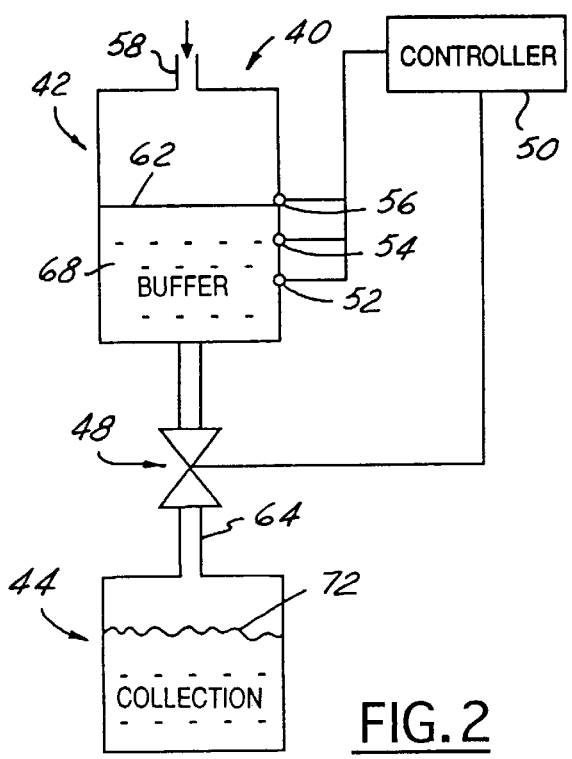
FIG. 2 is a schematic illustrating the present invention automated chemical drain system equipped with a microprocessor controlled valve.

Referring initially to FIG. 2, wherein a present invention automated drain system 40 is shown. It is seen that the system 40 is constructed of a first collection tank 42, a second collection tank 44, a microprocessor controlled valve 48, and a microprocessor controller 50. The first chemical collection tank 42 is equipped with three level sensors, i.e., a low level sensor 52, a mid-level sensor 54 and a high level sensor 56. Used chemical is fed into the first collection tank 42 through an inlet 58. The level sensors 52~56 sends out a signal to the microprocessor controller 50 when a critical level, or a threshold level 62 is detected in the first holding tank 42. The three level sensors can be replaced by two or even one level sensor. The additional level sensors, i.e., the mid-level sensor and high level sensor are normally used as secondary safety devices to prevent the failure of the low level sensor 52. The three level sensors shown in FIG. 2 can be advantageously positioned at any suitable location in the first collection tank 42. The controller 50 can be any one of a variety of suitable microprocessors which is capable of receiving an input signal from the level sensors 52~56 and then determine when the value exceeds a threshold value which is predetermined and stored in the microprocessor 50, and then sending out a signal to the valve 48 for opening the passageway 64 to the second chemical collection tank 44. The valve 48 can be advantageously designed as a solenoid operated valve for easy operation by the microprocessor controller 50.

The present invention automated chemical drain system 40 provides the additional benefit that it does not rely on the recognition of a high liquid level in the first collection tank 42 by a machine operator such that the valve 48 can be manually opened. This prevents any accidental overflow from the first collection tank 42 and thus any potential personnel injury, fire hazard and other damages to the facility. The controller 50 can be set such that when the low level sensor 52 is triggered, a warning light lites up in a control panel without opening the valve 48. When the midlevel sensor 54 senses a liquid level 62 and sends out a signal to the controller 50, the controller will then open valve 48 to drain chemical 68 through passageway 64 into the second collection tank 44. The third high level sensor 56 may be used as an additional safety device to send a signal to the controller 50 and to instruct the controller to open valve 48 in the event that the signal sent from the mid-level sensor 54 did not trigger the controller to open valve 48. The level sensors 52~56 can be provided in any one of suitable designs such as a float type sensor or an electrical resistance type sensor. The liquid level 72 in the second collection tank 44 is manually observed and monitored by an operator so that when it exceeds a certain level, it is removed and replaced with an empty tank.

Figure 3:
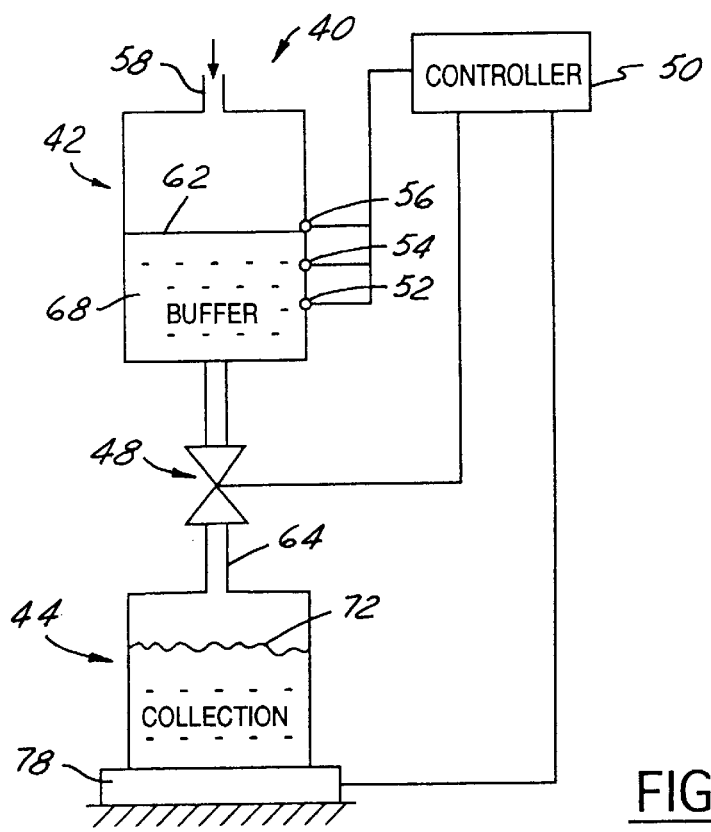
FIG. 3 is a schematic illustrating the present invention automated chemical drain system further equipped with a weight sensing device on the second collection tank.

The present invention automated chemical drain system may further include a weight sensing device 78. This is shown in FIG. 3. The weight sensing device 78 can be preset at a threshold value such that it sends out a signal when the weight of the second collection tank 44 exceeds such value to the controller 50. When the controller 50 receives such signal from the weight sensing device 78, it sends out a signal to valve 48 and shutting it off so that the chemical flow through passageway 64 is stopped. The controller 50 can further be provided with a warning alarm or light when such threshold weight is sensed so that a maintenance operator can be alerted to replace the second collection tank 44 with an empty tank. The weight sensing device 78 therefore provides further improvement in the present invention automated chemical drain system and an additional safety for preventing accidental overflow from the second collection tank 44. In practical use, the second holding tank 44 may be positioned at a floor level below the first holding tank 42. However, the controller 50 may be provided with indicator lights to indicate the weight of liquid contained in the second collection tank 44 such that the status of the tank can be monitored at any time.

While the present invention has been described in an illustrative manner, it should be understood that the terminology used is intended to be in a nature of words of description rather than of limitation.

Furthermore, while the present invention has been described in terms of two preferred embodiments, it is to be appreciated that those skilled in the art will readily apply these teachings to other possible variations of the invention.

The embodiment of the invention in which an exclusive property or privilege is claimed are defined in the following claims.

I claim:

1. A chemical drain system comprising:

a first tank for holding a chemical, at least one level sensor mounted in said first tank for sending out a first signal when a predetermined level of chemical is sensed, a controller for receiving said first signal from said at least one level sensor and sending out a second signal to a valve, said valve in fluid communication with said first tank and a second tank for receiving said second signal which opens said valve such that chemical flows into said second tank, and said second tank for receiving chemical from said first tank, said second tank being equipped with a weight sensing device for sending out a third signal to said controller for closing said valve when the weight sensed is over a threshold value.

2. A chemical drain system according to claim 1, wherein said first tank is a buffer tank for collecting used chemical.

3. A chemical drain system according to claim 1, wherein said at least one level sensor comprises two level sensors of a low level sensor and a high level sensor.

4. A chemical drain system according to claim 1, wherein said at least one level sensor comprises three level sensors of a low level sensor, a mid-level sensor and a high level sensor.

5. A chemical drain system according to claim 1, wherein said controller is a microprocessor.

6. A chemical drain system according to claim 1, wherein said valve is controlled by a solenoid valve by receiving said second signal.

7. A chemical drain system according to claim 1, wherein said second tank is a used chemical collection tank.

8. A chemical drain system according to claim 1, wherein said weight sensing device is an electronic scale.

9. An automated chemical drain system comprising:

a buffer tank for collecting chemical from a process machine, at least a first level sensor and a second level sensor disposed in said buffer tank for sensing a first fluid level, said first level sensor sending out a first signal when said first fluid level is reached, said second level sensor being a safety device for sensing a second fluid level and sending out a second signal when said first level sensor fails to function, a controller for receiving said first or said second signal from said first or second level sensors for sending out a third signal to a solenoid controlled valve for operation thereof, said solenoid controlled valve in fluid communication with said buffer tank and a collection tank, and a collection tank for collecting chemical from said buffer tank, said collection tank being equipped with a weight sensing device for monitoring the weight of said collection tank and for sending out a fourth signal to said controller for closing said solenoid controlled valve when the weight sensed is over a threshold value.

10. An automated chemical drain system according to claim 9, wherein said at least two level sensors comprises a high level sensor, a mid-level sensor and a low level sensor.

11. An automated chemical drain system according to claim 9, wherein said controller is a microprocessor for receiving said first and said second signal and sending out said third signal.

12. An automated chemical drain system according to claim 9, wherein said collection tank is a waste chemical collection tank.

13. A chemical drain system according to claim 9, wherein said weight sensing device is an electronic scale.

14. A method for draining a chemical comprising the steps of:

providing a first collection tank equipped with a level sensor, providing a second collection tank, providing a valve for controlling a flow from the first collection tank to the second collection tank by a controller, providing a weight sensing device to said second collection tank for sending out a third signal to shut off said valve when a maximum allowable weight of the second tank is detected, and sending a first signal from said level sensor to the controller when a level exceeding a threshold value in said first tank is sensed such that a second signal is sent by the controller to open said valve to drain said chemical from the first tank to the second tank.

* * * * *